United States Patent [19]
Morris

[11] Patent Number: 5,931,639
[45] Date of Patent: Aug. 3, 1999

[54] HELICOPTER BLADE ASSEMBLY ADAPTED TO PERMIT RAPID FORWARD FLIGHT

[76] Inventor: David Curt Morris, 455 W. 23rd St., #14F, New York, N.Y. 10011

[21] Appl. No.: 08/730,871

[22] Filed: Oct. 18, 1996

[51] Int. Cl.$^6$ ................................................ B64C 27/39
[52] U.S. Cl. .................... 416/108; 416/114; 416/132 R; 416/132 A; 416/150
[58] Field of Search ................................ 416/1, 108, 112, 416/114, 132 R, 132 A, 134 A, 138, 149, 150, 162, 164, 168 R; 244/12.2, 23 C, 17.25, 39

[56] References Cited

U.S. PATENT DOCUMENTS

| | | | |
|---|---|---|---|
| 891,093 | 6/1908 | Parsons et al. | 416/132 A |
| 1,013,402 | 1/1912 | Kingsbury | 416/168 R |
| 2,108,839 | 2/1938 | Wilford et al. | 416/112 |
| 2,611,441 | 9/1952 | Slechta | 416/108 |
| 2,823,875 | 2/1958 | Peterson . | |
| 3,146,970 | 9/1964 | Girard . | |
| 3,794,273 | 2/1974 | Girard . | |
| 4,195,800 | 4/1980 | Wallace . | |
| 4,930,988 | 6/1990 | Griffith | 416/114 |
| 5,190,242 | 3/1993 | Nichols . | |
| 5,318,248 | 6/1994 | Zielonka . | |

FOREIGN PATENT DOCUMENTS 748966  5/1956  United Kingdom .

*Primary Examiner*—Christopher Verdier
*Attorney, Agent, or Firm*—Chernoff, Vilhauer, McClung & Stenzel, LLP

[57] ABSTRACT

A helicopter blade assembly for permitting rapid forward flight in a helicopter having separate means for providing a forward impetus. The assembly has a set of rotatable blades attached to a substantially vertical mast. These blades slope downward near to their distal ends, thereby creating an inverted disk virtual air foil when the blades are rapidly rotated by the mast. In a preferred embodiment the camber of the blades and, therefore, the shape of the virtual air foil is controllable.

7 Claims, 15 Drawing Sheets

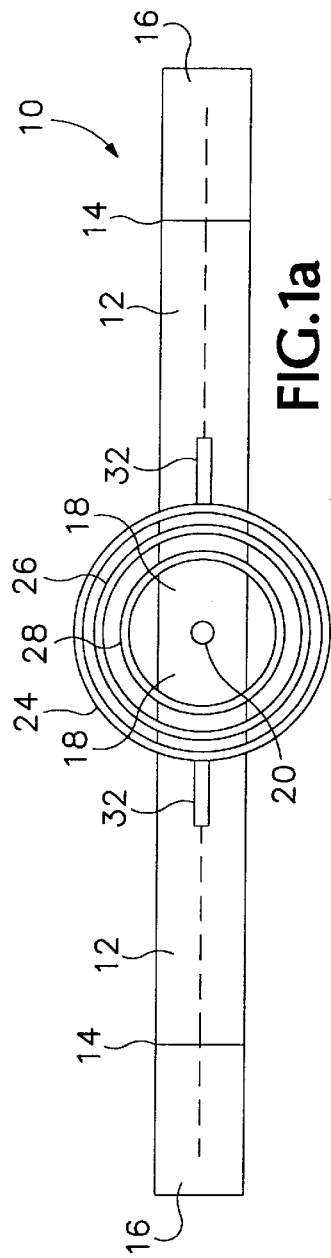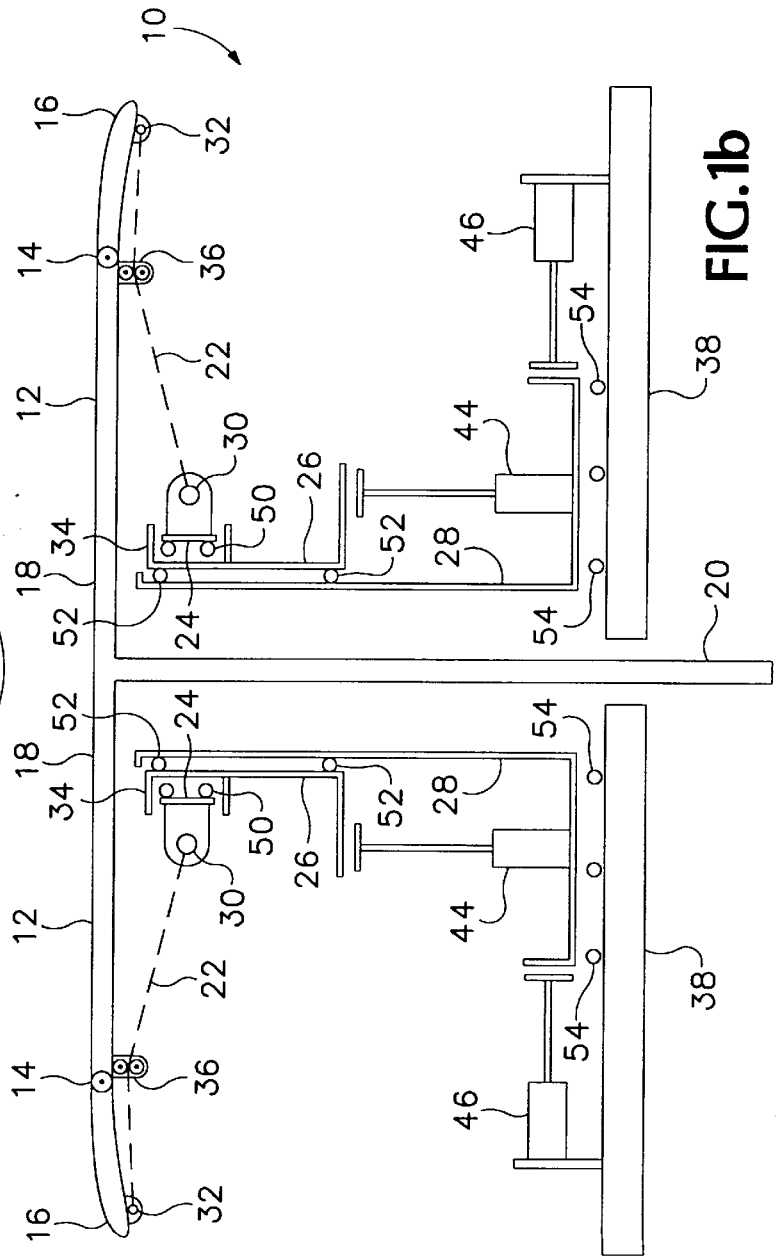

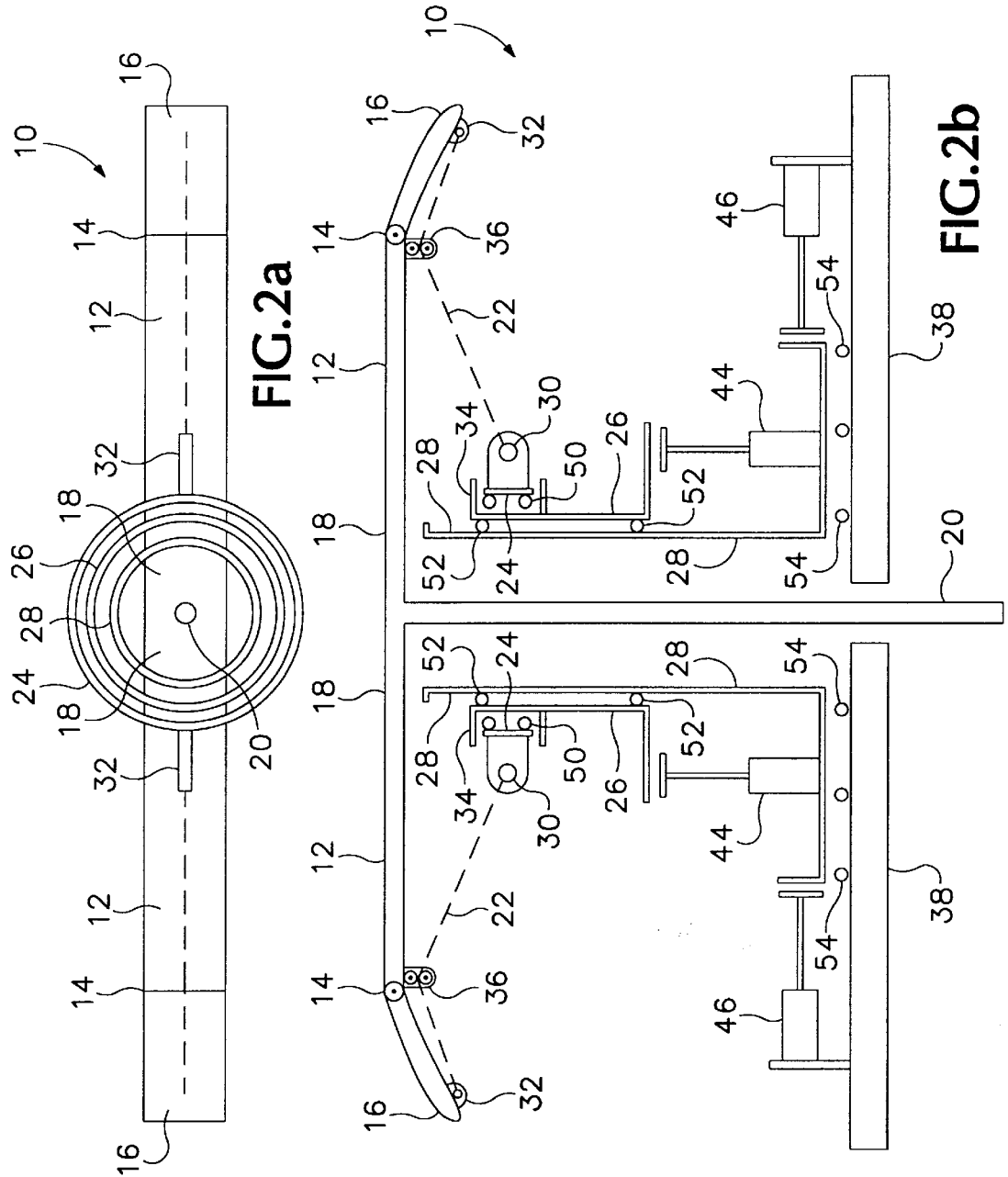

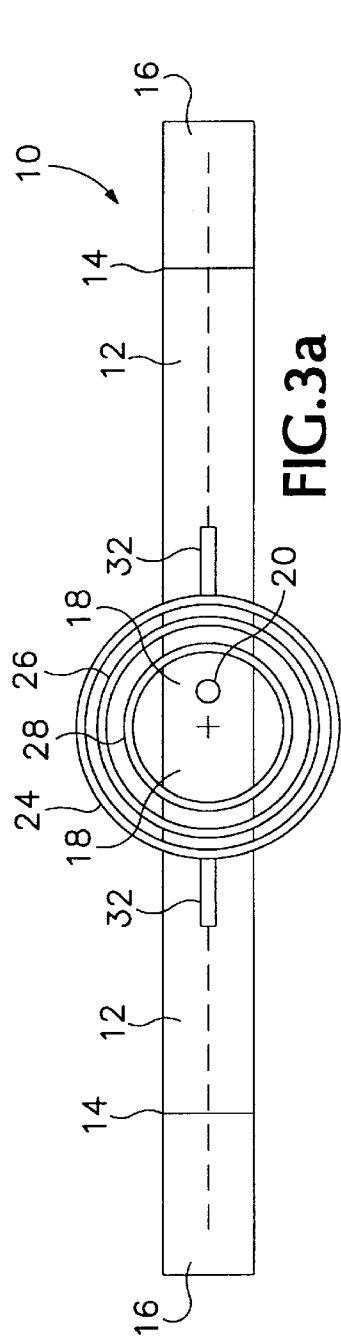
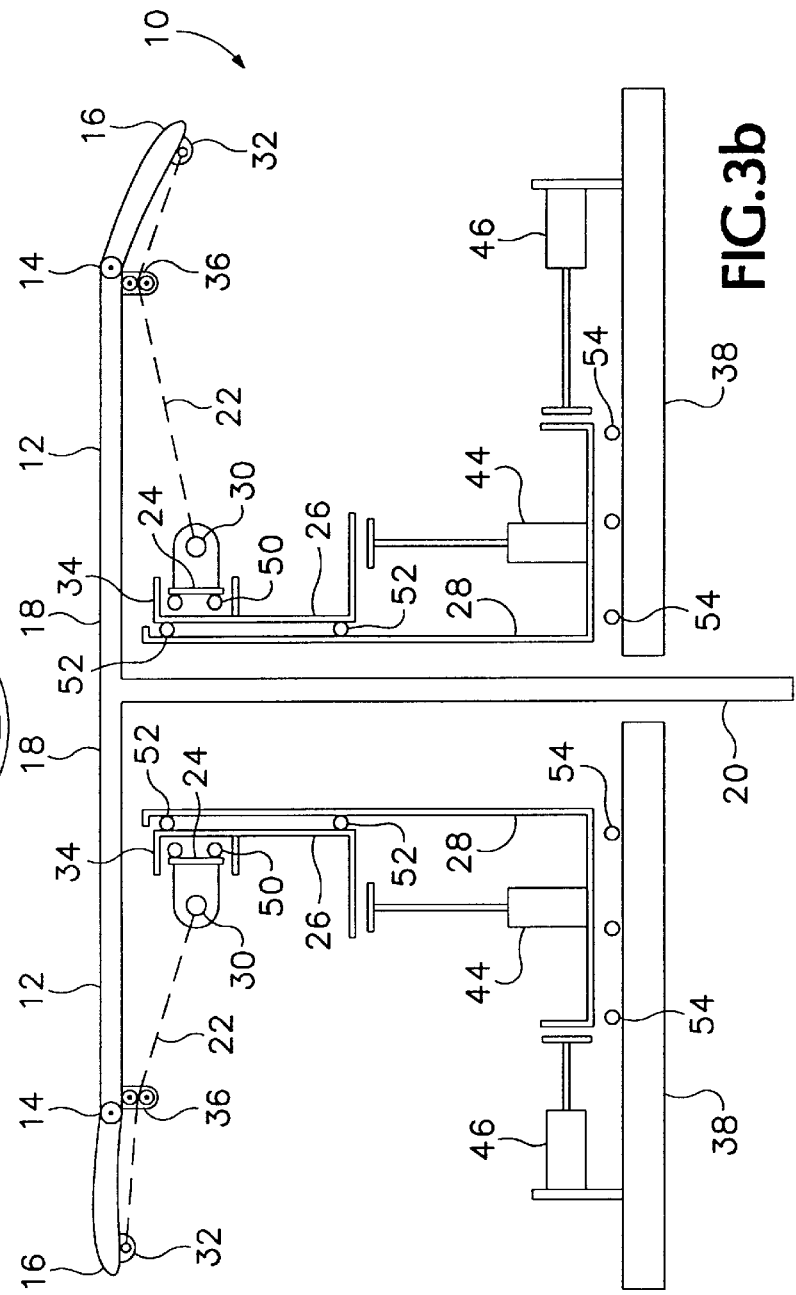

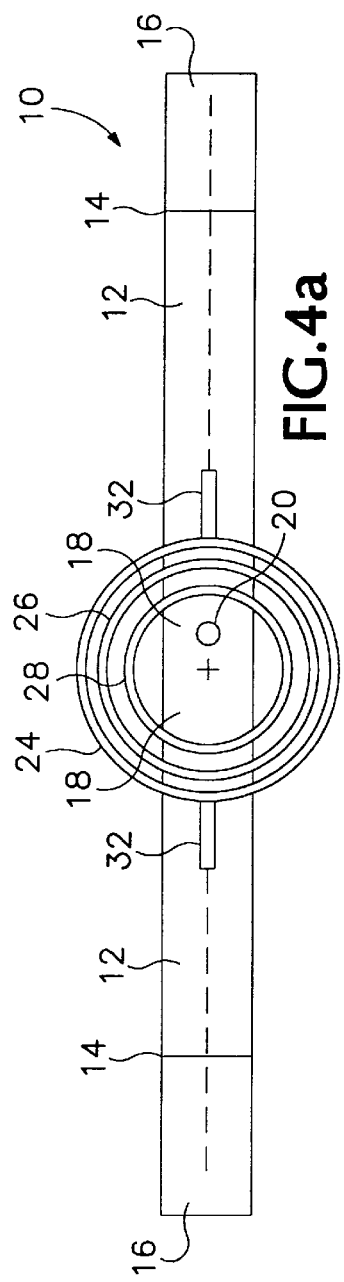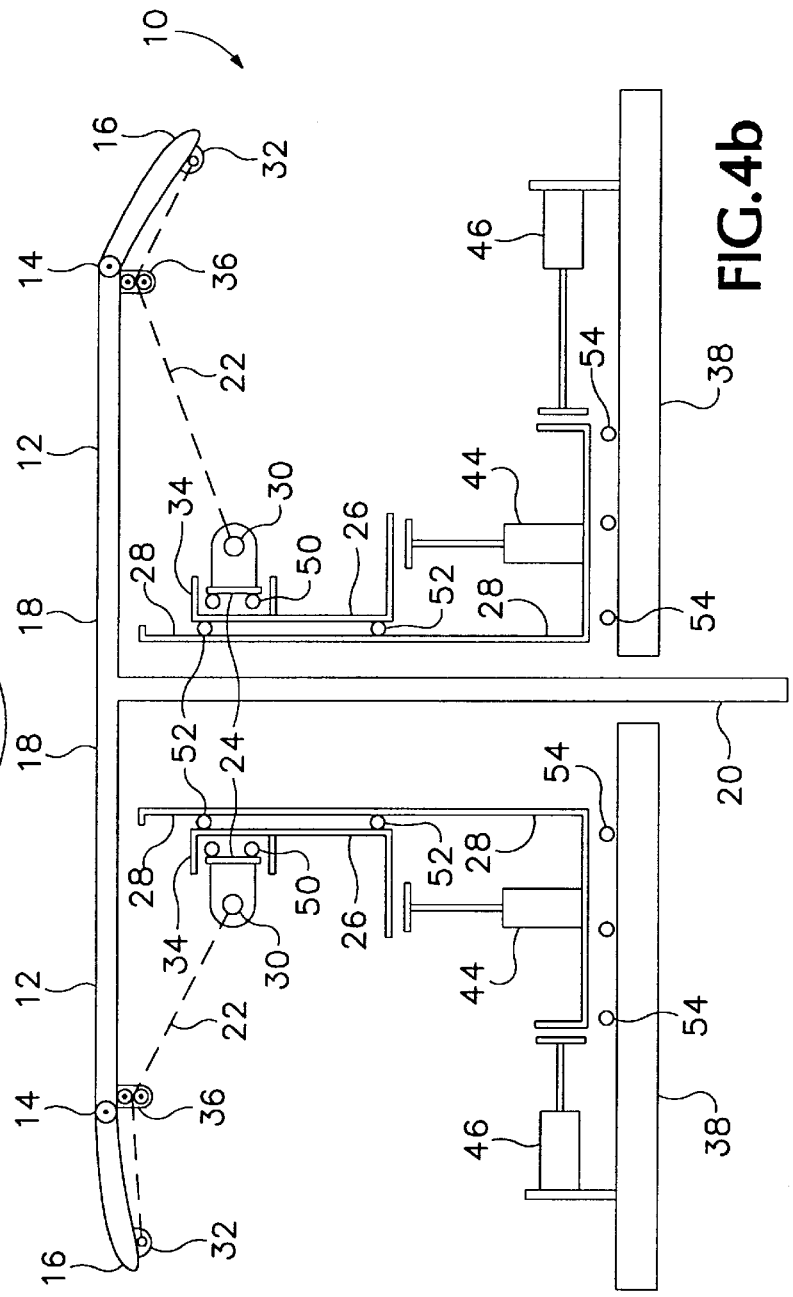

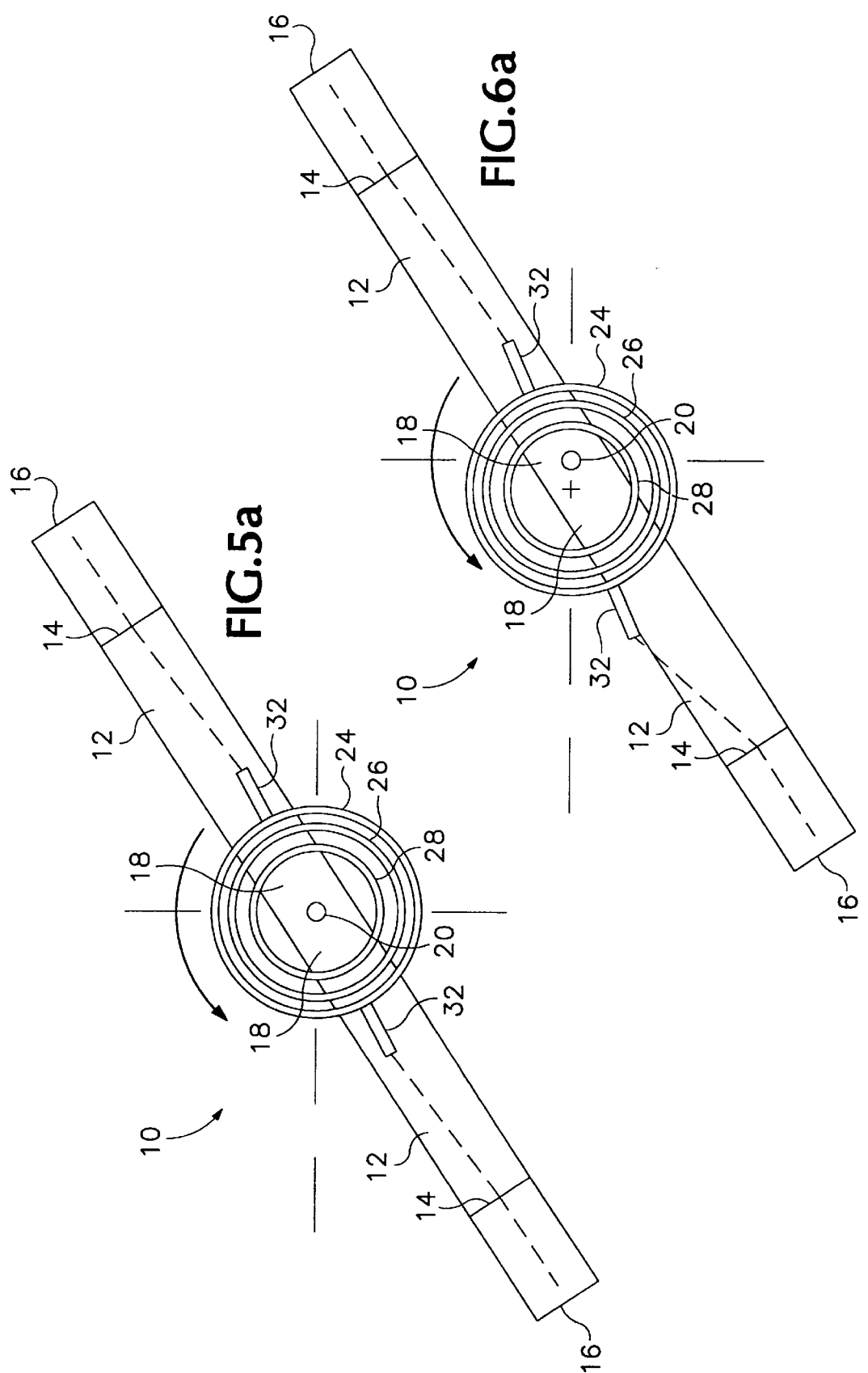

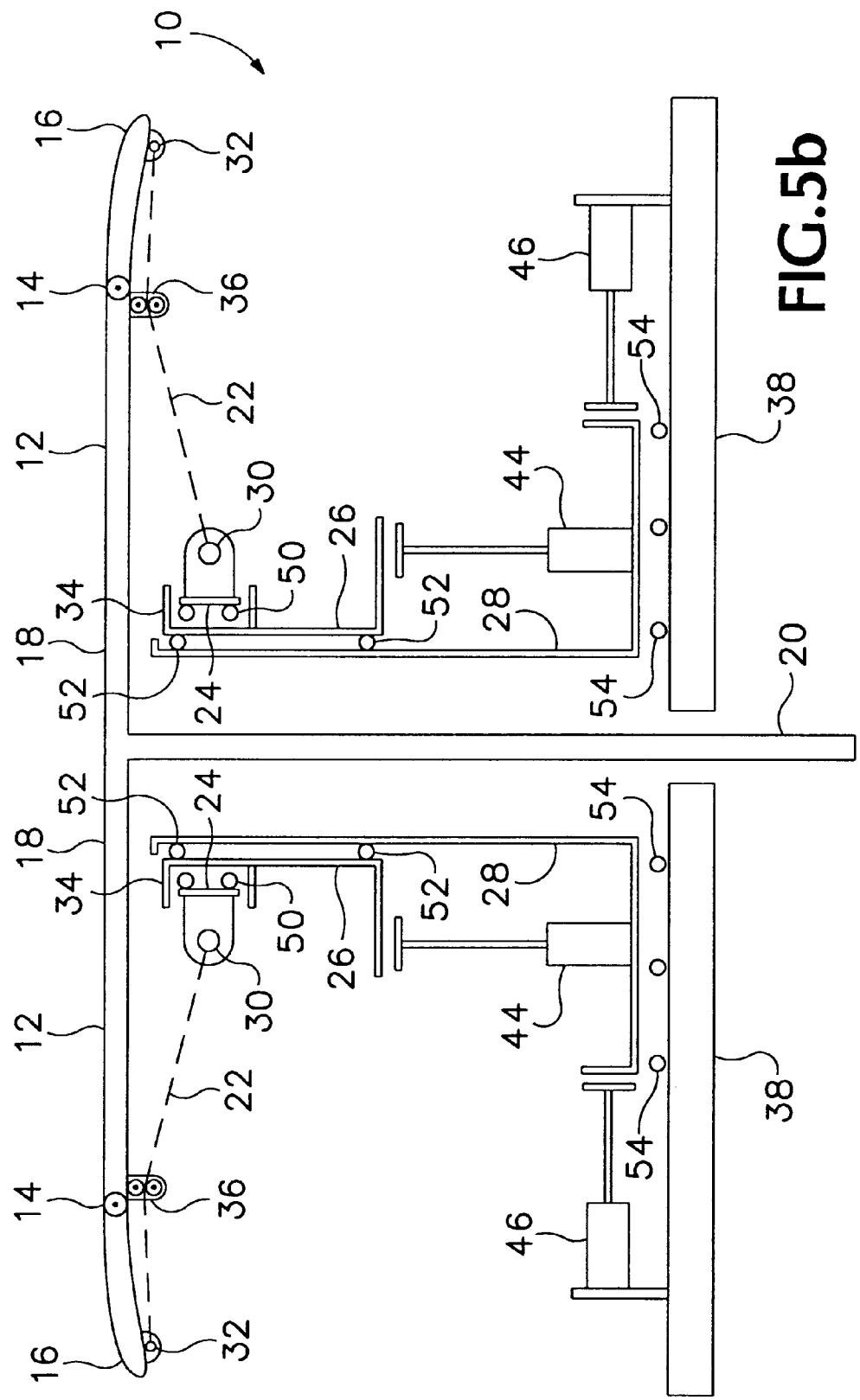

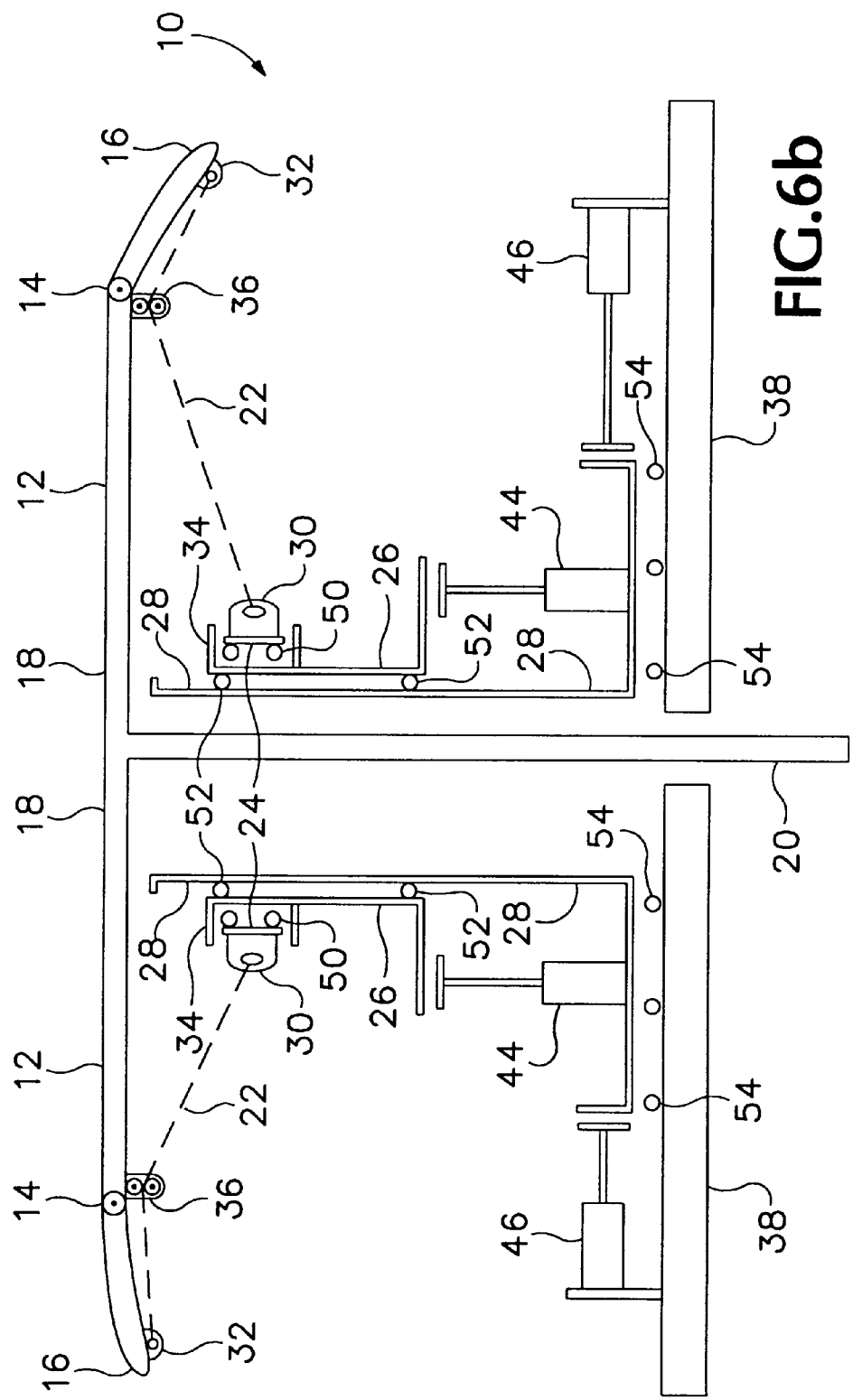

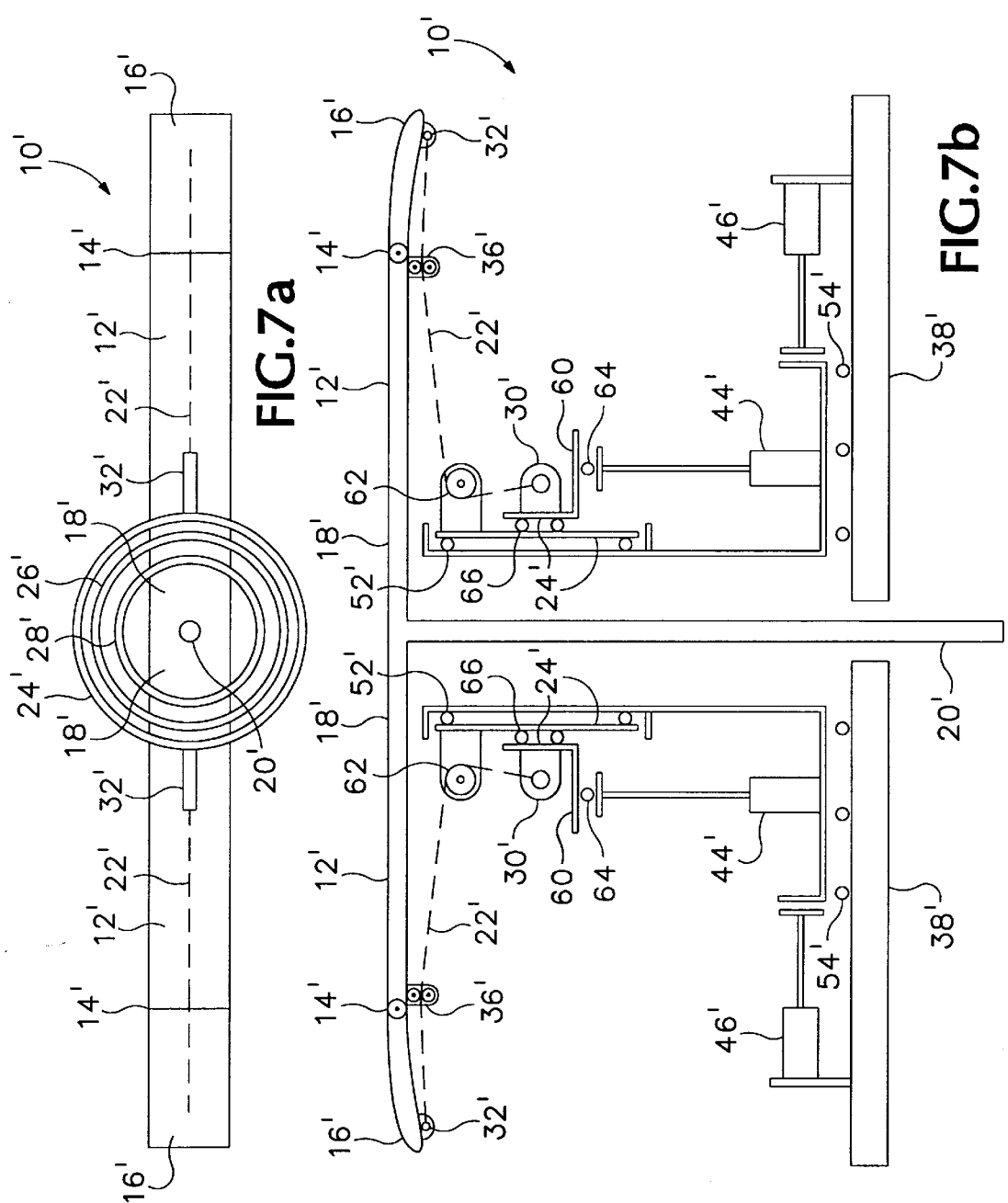

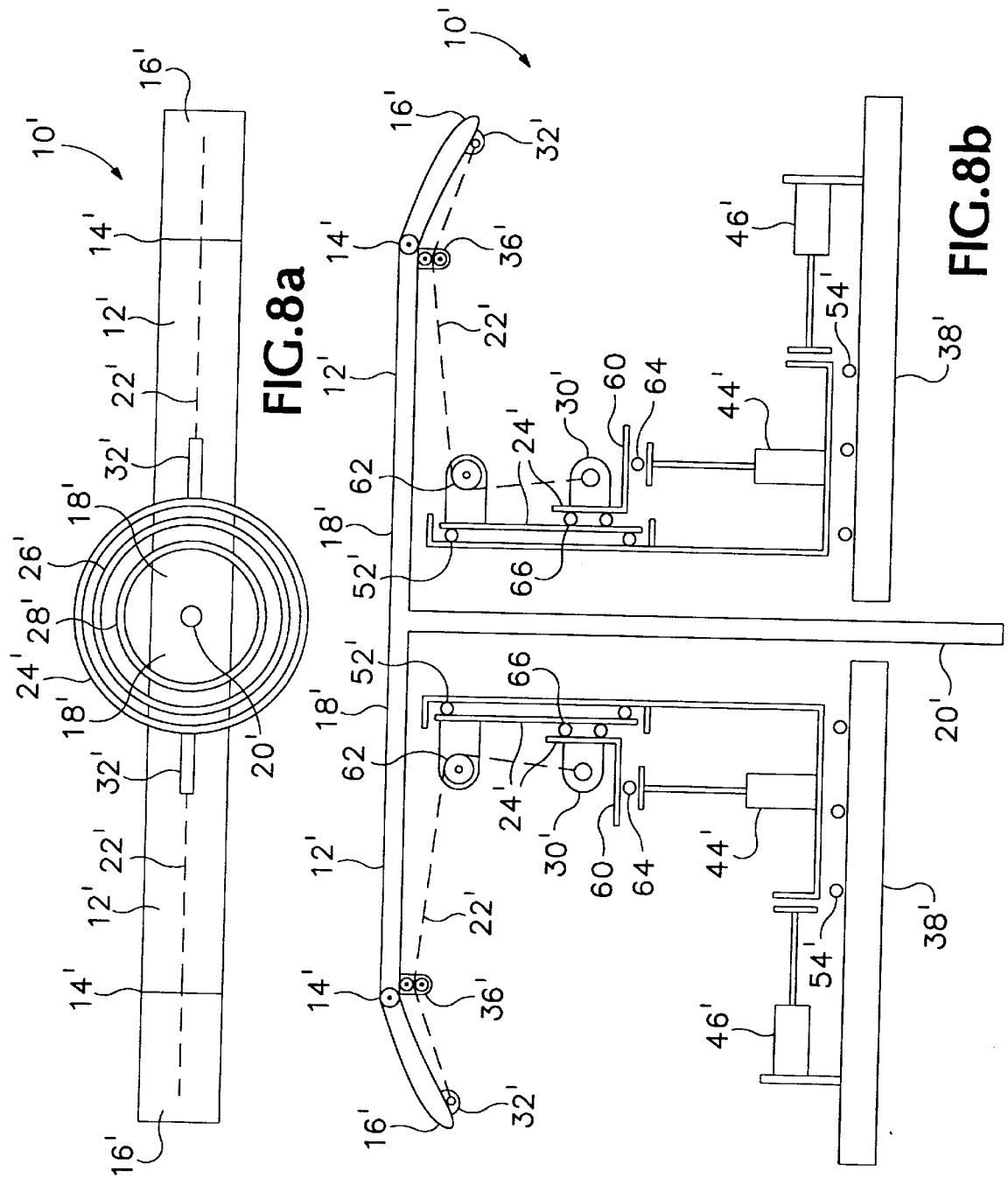

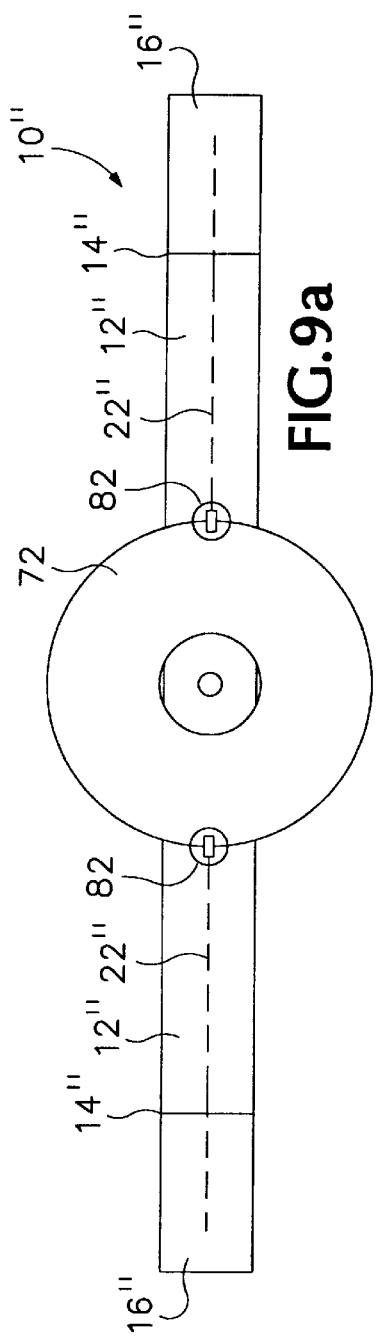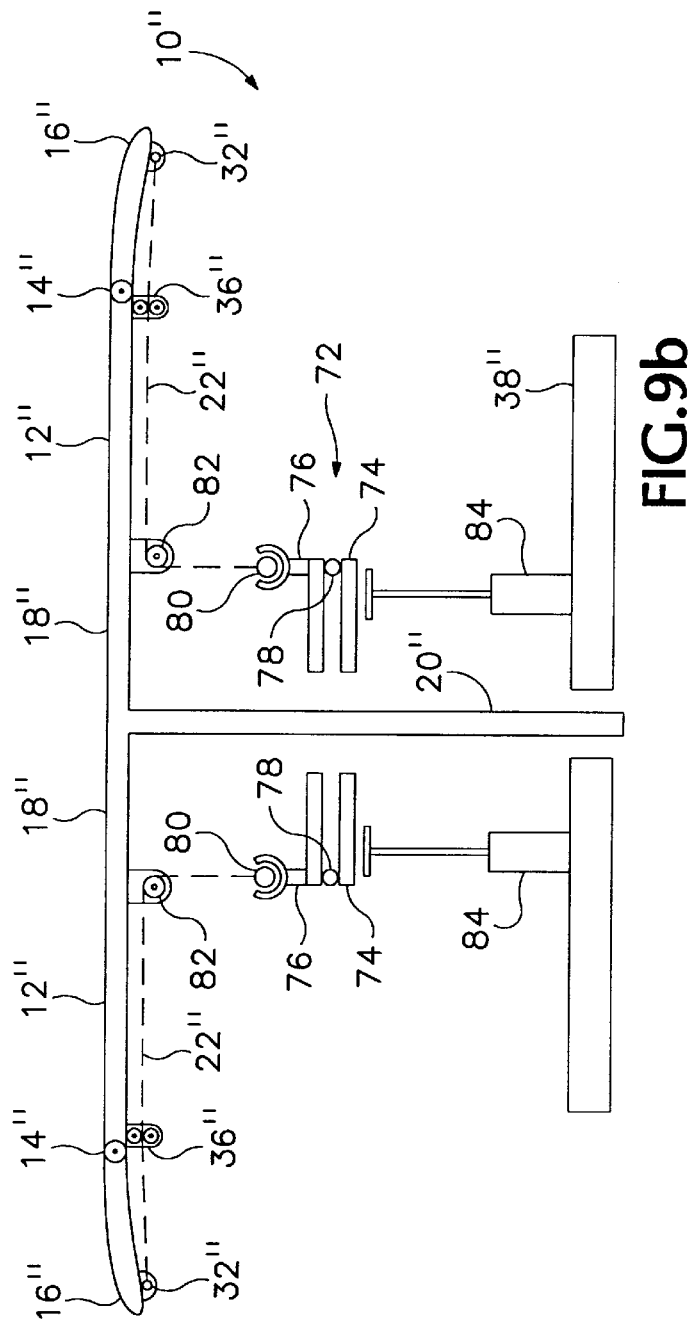

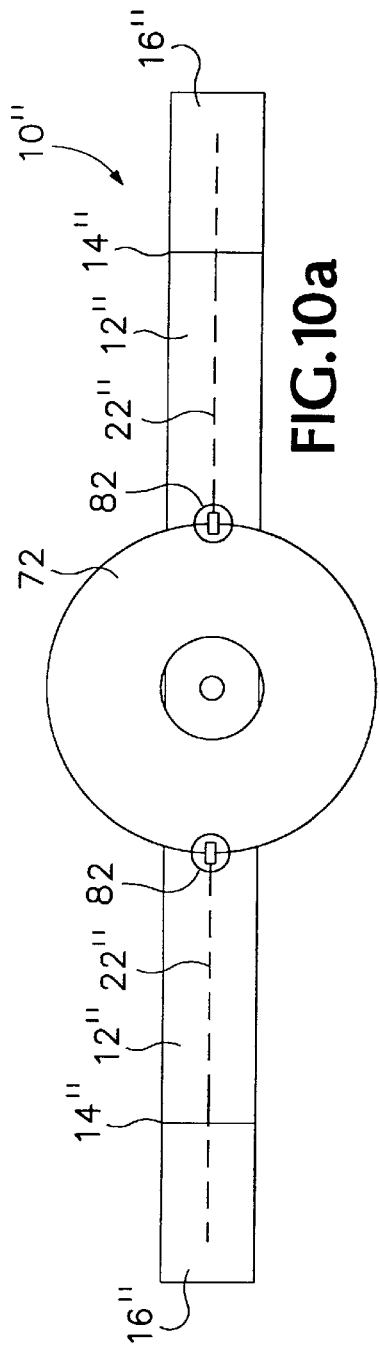
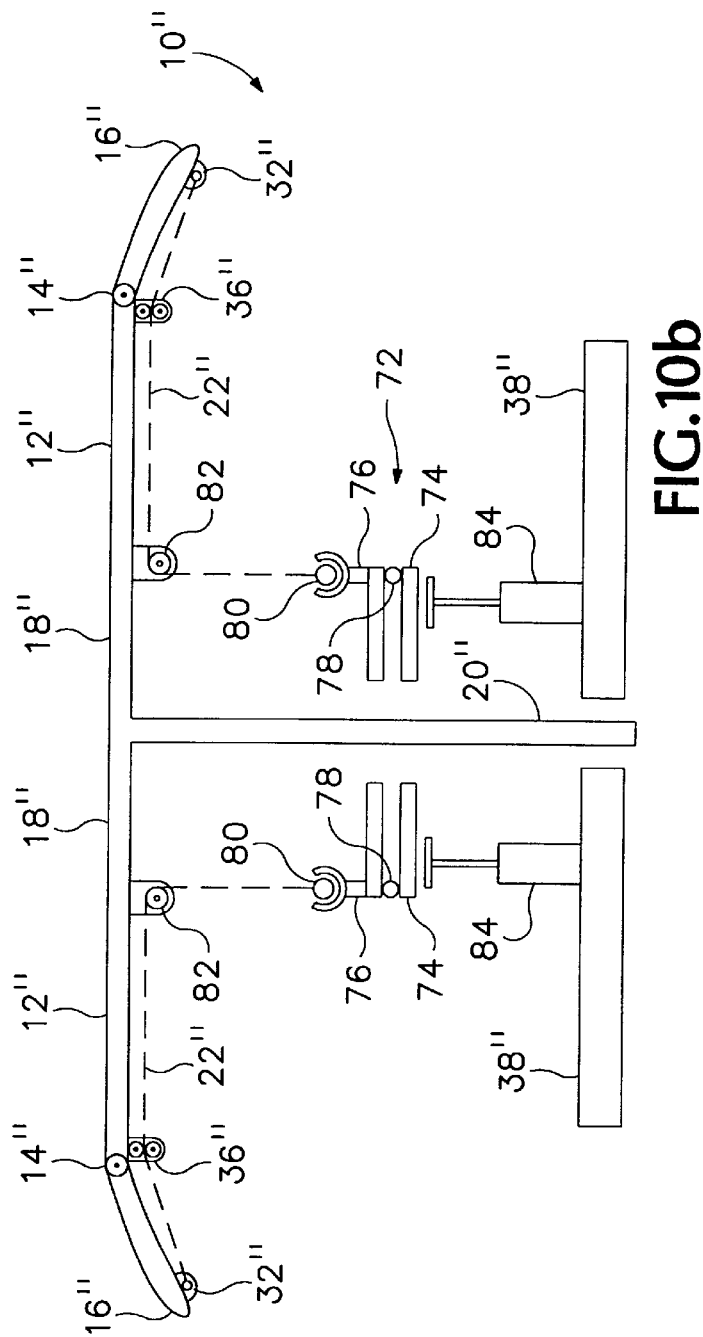

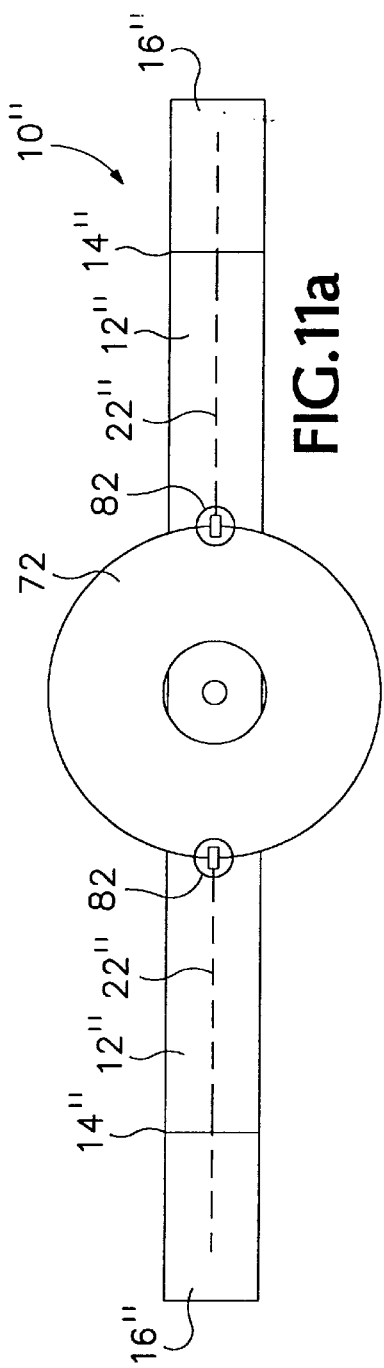
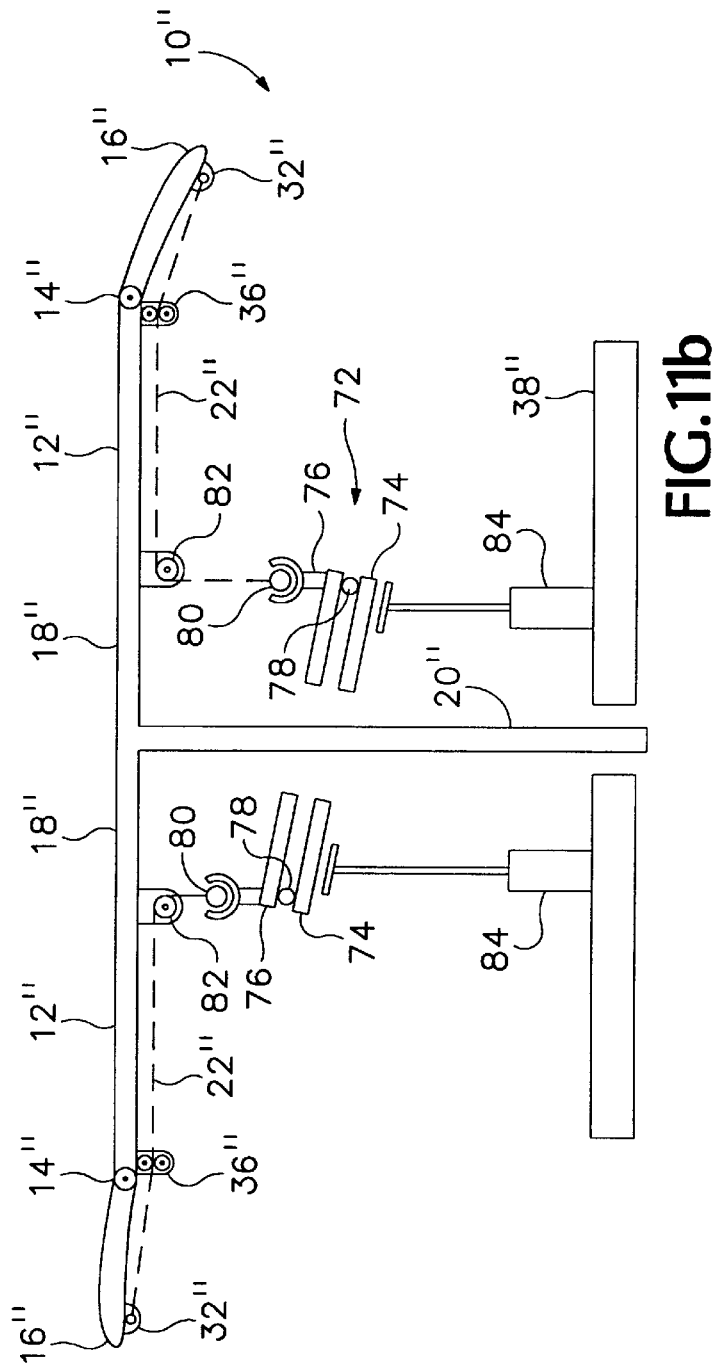

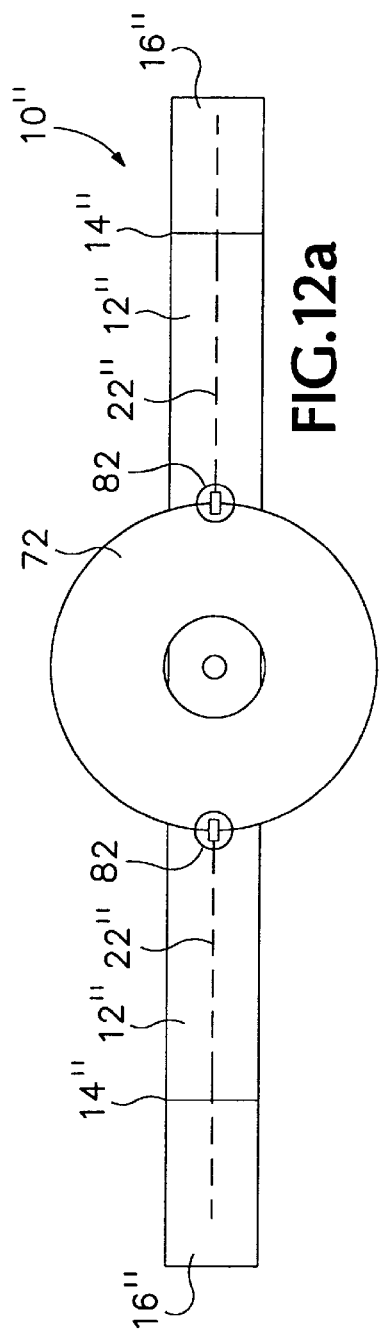
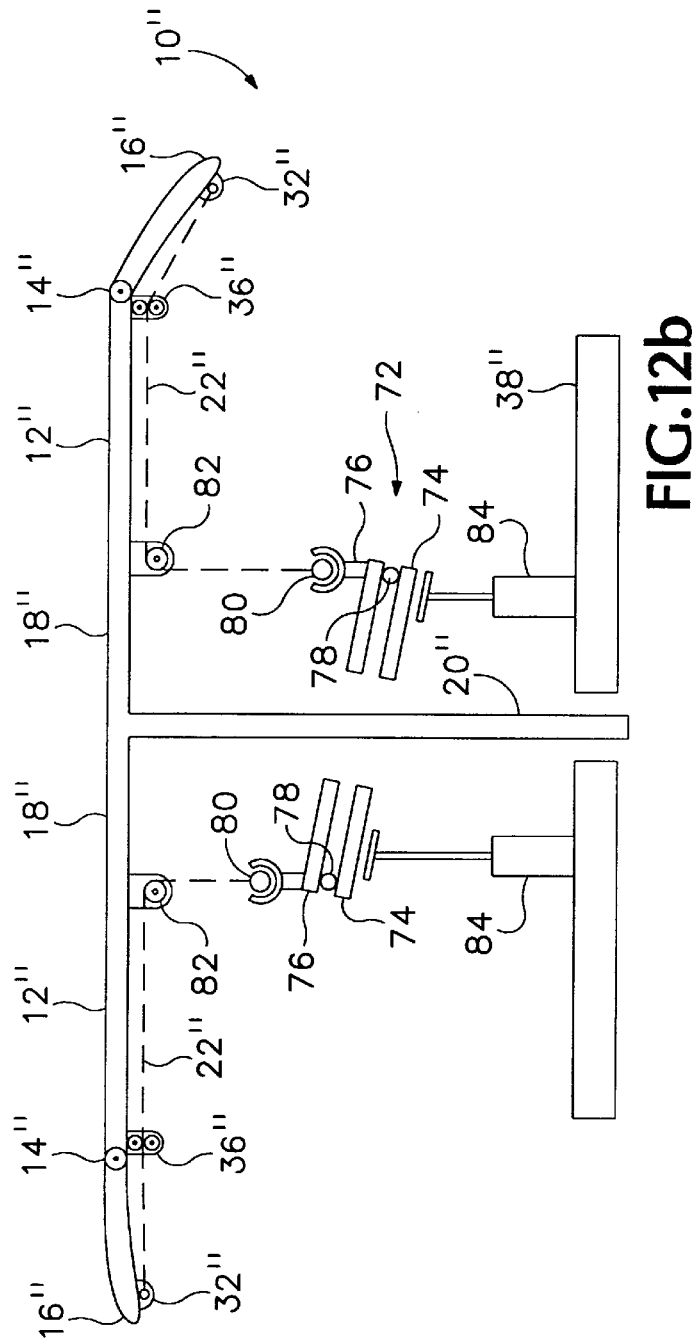
FIG.12a
FIG.12b

HELICOPTER BLADE ASSEMBLY ADAPTED TO PERMIT RAPID FORWARD FLIGHT

TECHNICAL FIELD

The present invention relates to helicopters. More specifically the present invention relates to a helicopter blade assembly.

BACKGROUND OF THE INVENTION

The helicopter, when introduced, was a revolutionary aircraft. With its ability to take off and land vertically, the helicopter was able to accomplish maneuvers that no fixed wing craft could perform. Unfortunately, the aerodynamics of rotating blades impose a limit on helicopter maximum forward speed (apart from drag, motive power and other considerations).

The standard single, tandem or lateral-twin rotor helicopter blades provide lift as well as forward impetus. Even with the addition of independent propulsion from either a propeller or jet engine, the individual blade flight characteristics present the following problem at high speeds. In forward flight, a blade advances into the airstream and then retreats. In high speed forward flight, the retreating blade speed may match the speed of the advancing airstream, producing a zero lift condition. The advancing blade then carries the full lift load, with a destablilizing overturning moment on the craft itself. At speeds below this condition, cyclic pitch control can successfully compensate for the potential instability. There is a tilt-rotor design which solves this problem by directing the forced flow of air in the direction required, by rotating engines and blades altogether. The following is offered as a less complex mechanical solution to this problem.

SUMMARY OF THE INVENTION

The present invention is a helicopter blade assembly for a craft with either one or two blade-sets. The blade assembly is constructed so that the rotation of the blades provides lift during takeoff and landing. During rapid forward flight, however, the blades sweep out the shape of a virtual disk that acts as a lifting body, so that as the virtual disk cuts rapidly through the air it generates lift. The aircraft to which the assembly is attached requires an independent means of forward propulsion (such as a propeller or jet engine) because the blade assembly is generally not used to pull the helicopter through the air in the same manner as do conventional helicopter blade assemblies.

The shape and, therefore, the lift characteristics of the "swept" disk are controlled by governing the camber of the blades as they rotate, thereby creating the equivalent of ailerons on a fixed wing. This would allow a craft to execute turns and other maneuvers.

Additional objects and advantages of this invention will be apparent from the following detailed description of preferred embodiments thereof which proceeds with reference to the accompanying drawings.

BRIEF DESCRIPTION OF THE DRAWINGS

FIG. 1a is a bottom view of a rotatable helicopter blade assembly according to the present invention;

FIG. 1b is a side view of the rotatable helicopter blade assembly of FIG. 1a;

FIG. 2a is a bottom view of the rotatable helicopter blade assembly of FIG. 1b configured to produce a greater symmetrical camber;

FIG. 2b is a side view of the rotatable helicopter blade assembly of FIG. 1a configured to produce a symmetrical camber;

FIG. 3a is a bottom view of the rotatable helicopter blade assembly of FIG. 1b configured to produce an asymmetrical camber;

FIG. 3b is a side view of the rotatable helicopter blade assembly of FIG. 1a configured to produce an asymmetrical camber;

FIG. 4a is a bottom view of the rotatable helicopter blade assembly of FIG. 1b configured to produce an alternative asymmetrical camber;

FIG. 4b is a side view of the rotatable helicopter blade assembly of FIG. 1a configured to produce an alternative asymmetrical camber;

FIG. 5a is a bottom view of the rotatable helicopter blade assembly of FIG. 1b configured to produce a symmetrical camber, and shown while rotating;

FIG. 5b is a side view of the rotatable helicopter blade assembly of FIG. 1a configured to produce a symmetrical camber, and shown while rotating;

FIG. 6a is a bottom view of the rotatable helicopter blade assembly of FIG. 1b configured to produce an asymmetrical camber and shown while rotating;

FIG. 6b is a side view of the rotatable helicopter blade assembly of FIG. 1a configured to produce an asymmetrical camber, and shown while rotating;

FIG. 7a is a bottom view of an alternative rotatable helicopter blade assembly according to the present invention;

FIG. 7b is a side view of the rotatable helicopter blade assembly of FIG. 7a;

FIG. 8a is a bottom view of the alternative rotatable helicopter blade assembly of FIG. 7a, configured to produce an asymmetrical camber;

FIG. 8b is a side view of the rotatable helicopter blade assembly of FIG. 7a configured to produce a greater asymmetrical camber;

FIG. 9a is a bottom view of an additional alternative rotatable helicopter blade assembly according to the present invention;

FIG. 9b is a side view of the rotatable helicopter blade assembly of FIG. 9a;

FIG. 10a is a bottom view of the alternative rotatable helicopter blade assembly of FIG. 9a, configured to produce a symmetrical camber;

FIG. 10b is a side view of the rotatable helicopter blade assembly of FIG. 9a configured to produce a symmetrical camber;

FIG. 11a is a bottom view of the alternative rotatable helicopter blade assembly of FIG. 9a, configured to produce an asymmetrical camber;

FIG. 11b is a side view of the rotatable helicopter blade assembly of FIG. 9a configured to produce an asymmetrical camber;

FIG. 12a is a bottom view of the alternative rotatable helicopter blade assembly of FIG. 9a, configured to produce an alternative asymmetrical camber;

FIG. 12b is a side view of the rotatable helicopter blade assembly of FIG. 9a configured to produce a greater alternative asymmetrical camber;

DETAILED DESCRIPTION OF PREFERRED EMBODIMENT

Figure 13A:
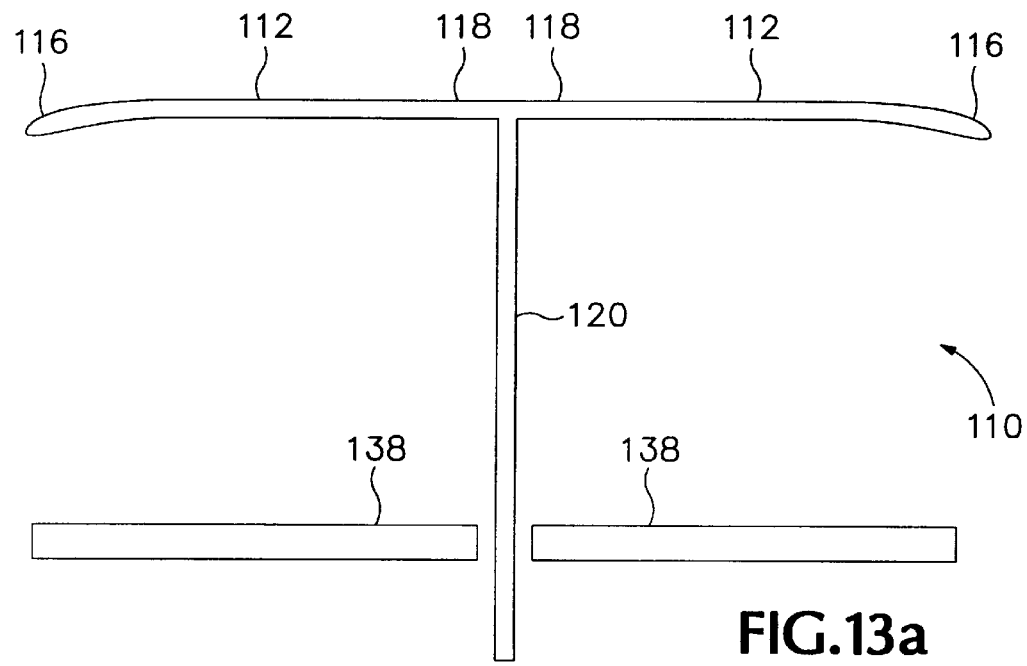
FIGS. 13a–13d are side views of additional alternative rotatable helicopter blade assemblies according to the present invention.

A preferred embodiment of a rotatable blade assembly 10, according to the present invention is shown in FIGS. 1a–4b. Each of blades 12 has a hinge 14 between a distal end 16 and a proximal end 18. Each proximal end 18 is fixedly mounted to a mast 20. A connector 22 connects each distal end 16 to a collar 24, which is rotatably mounted about a vertically adjustable circular track element 26, which itself is vertically adjustably mounted about horizontally adjustable hollow post structure 28. In greater detail, connector 22 connects radially projecting eyelet 30 of collar 24 with downwardly projecting eyelet 32 of blade 12, so that as blades 12 rotate, collar 24 is pulled about a circular track 34 of track element 26. A pair of rollers 36 help to guide each connector 22. Hollow post structure 28 is horizontally adjustably mounted to a circular plate 38 which forms a portion of the frame of a helicopter.

A vertically oriented actuator 44, typically hydraulic or electrical, adjusts the vertical position of adjustable circular track element 26, thereby controlling the symmetrical camber of blades 12. In addition, a horizontal actuator 46 is used to adjust the asymmetrical camber of blades 12 by moving hollow post 28 horizontally relative to blades 12 and mast 20.

A first set of bearings 50 facilitates the rotation of collar 24 about track 34. A second set of bearings 52 facilitates the vertical movement of track element 26 relative to hollow post structure 28. Finally, a third set of bearings 54 facilitates the horizontal movement of hollow post structure 28 relative to circular plate 38.

It is generally necessary to alter the camber of the blades in response to different flight characteristics. FIGS. 1a and 1b show blades 12 in a flat configuration. This is similar to the shape of standard helicopter blades. FIGS. 2a and 2b show rotatable blade assembly 10 configured with circular track element 26 lowered relative to mast 20 and blades 12, to cause each blade 12 to deform downwardly at distal end 16. The shape swept out by blades 12 in this configuration is similar to that of an inverted flying disk and has the similar aerodynamic property of providing lift.

FIGS. 3a and 3b show assembly 10 with hollow post 28 moved to the left to impart an asymmetrical camber to the shape of the virtual lifting body. In this diagram, whichever blade is in the leftmost position will have a downward slope at its distal end, because it will be pulled inwardly by connector 22 which is in turn pulled inwardly due to the position of hollow post 28. FIGS. 4a and 4b show assembly 10 with circular track element 26 shifted down slightly relative to the position shown in FIGS. 3a and 3b relative to the position, causing both distal ends 16 to be tilted slightly more downwardly. The flexibility of the control of the shape of blades 12 shown in FIGS. 1–4 is useful in the steering and control of the helicopter to which rotatable blade assembly 10 is affixed. Different shapes are used depending on the desired flight characteristics.

FIGS. 5a and 5b show the embodiment and symmetrical camber of FIGS. 1a and 1b but with blades 12 rotating and pulling collar 24 about track 34. This motion is indicated by the pitch of connectors 22. FIGS. 6a and 6b show the same embodiment with camber of FIGS. 4a and 4b imparted to the blades 12 and with blades 12 rotating and pulling collar 24 about track 34.

FIGS. 7a–7b and 8a–8b show an additional preferred embodiment of the present invention. Elements which are similar to elements of FIGS. 1a–4b are referenced by the same number as in FIGS. 1a–4b, but with the addition of a prime mark. As in the embodiment of FIGS. 1–4, the asymmetrical camber of the blades is set by the relative horizontal position of mast 20' with respect to hollow post 28'. Rotatable collar 24', however, is vertically stationary. The symmetric camber of blades 12 is set by vertically moving vertically adjustable eyelets-bearing collar 60 which rotates in tandem with collar 24'. In addition, connectors 22' are prevented from cutting through the air by guidewheels 62 mounted so that they radially project from collar 24'. Bearings 64 facilitate the rotation of collar 60 whereas bearings 66 facilitate the vertical movement of collar 60.

FIGS. 9a–12b show an additional alternative preferred embodiment. In these drawings, elements which are analogous to elements in FIG. 1–4 are referenced with the same reference numbers, but with the addition of a double prime mark. In this embodiment the camber of the blades is determined by the orientation of a swash plate assembly 72, comprised of nonrotating plate 74, rotating plate 76, bearings 78, and connector attachment sockets 80. Guide wheels 82 attached to blades 12 guide connectors 22'. Two actuators 84 control the vertical position of assembly 72 which determines the symmetric camber of the blades 12 and the orientation of the assembly 72 determines the asymmetric camber of blades 12. In a swash plate assembly 72, as in swash plate assemblies in general, the position of the rotatable plate, relative to the nonrotatable plate is fixed, except that the rotatable plate may rotate freely about its axis of rotation. FIGS. 9a and 9b show blade assembly 10" with swash plate assembly 72 oriented and positioned so that blades 12" have a flat, symmetric camber. FIGS. 10a and 10b show blade assembly 10" with swash plate assembly 72 oriented and positioned so that blades 12" have a symmetric camber and point downward near distal ends 16". FIGS. 11a and 11b show swash plate assembly 72 at an angle, imparting an asymmetric camber to blades 12". Finally, FIGS. 12a and 12b show swash plate assembly 72 at an angle and shifted downward relative to its position in FIGS. 11a and 11b, thereby imparting an asymmetric camber and with distal ends 16" pointing moved downward with respect to their positions in FIGS. 11a and 11b.

Figure 13B:
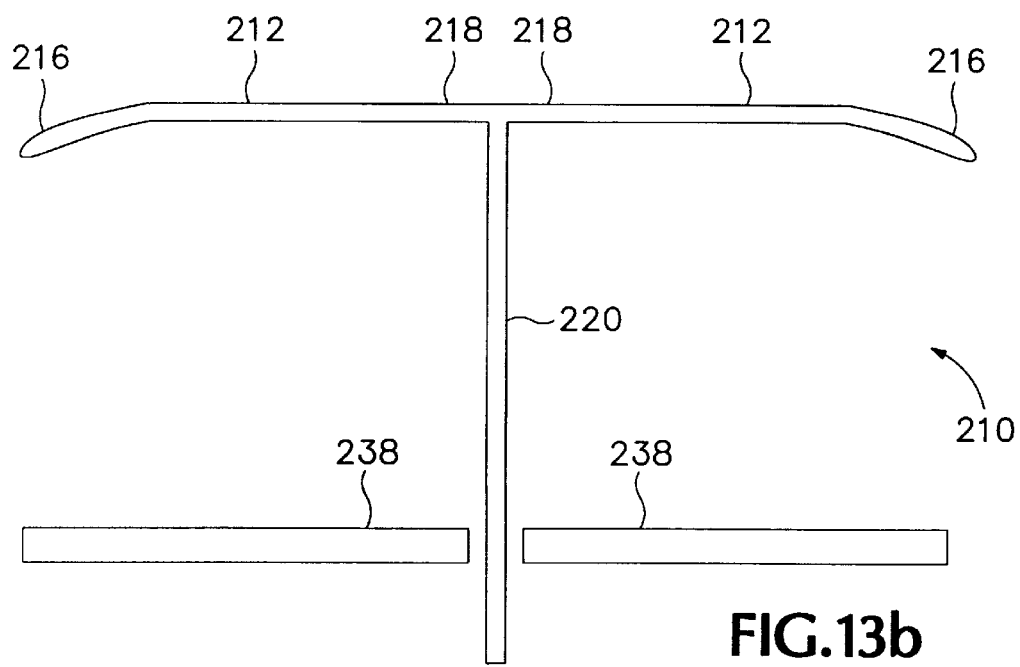
Figure 13C:
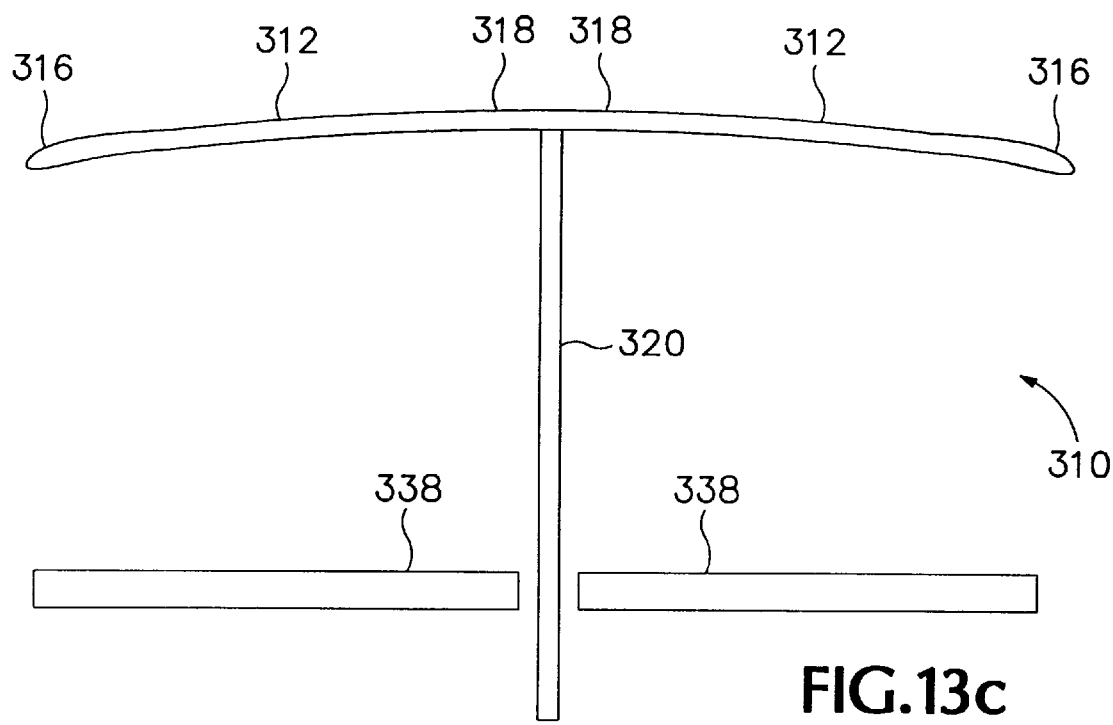
Figure 13D:
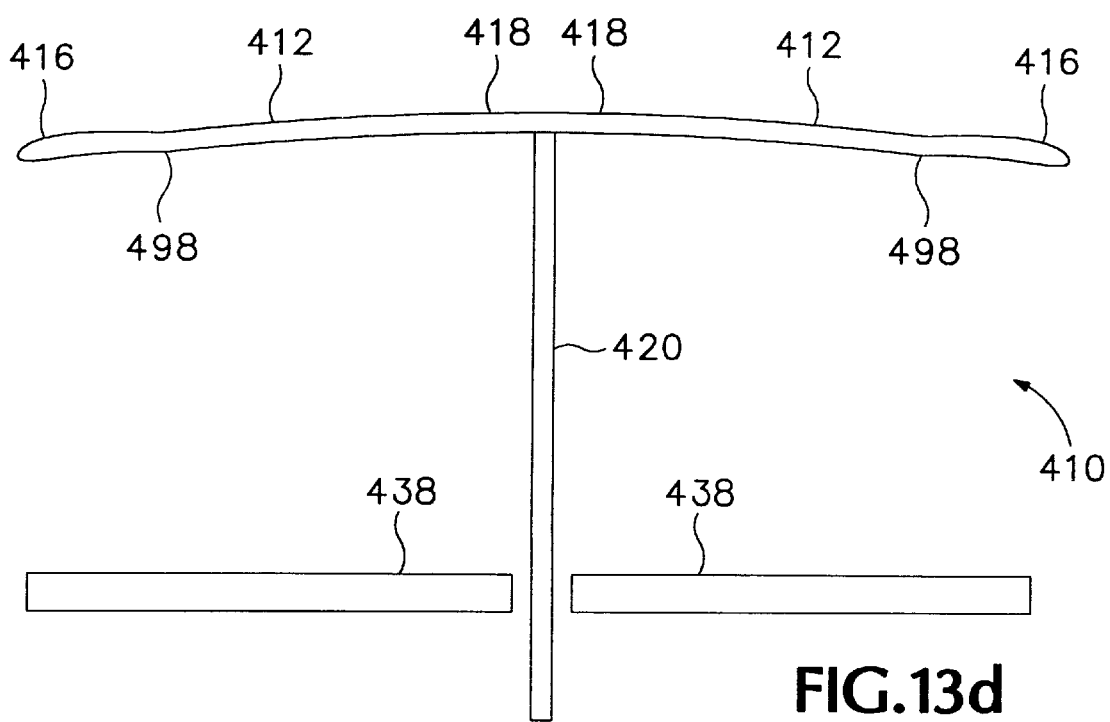

FIGS. 13a–13d show a number of different types of rotatable blade assemblies according to the present invention that have rigid blades. Although the tips of these blades would not be controllable, like the blades of FIGS. 1–12, they would perform the same function of sweeping out a lifting body. The helicopter on which one of these blade assemblies would be attached would have additional means for effecting steering and control functions. Parts in these drawings which are analogous to parts in FIGS. 1–4 are referenced by the same number but with a 1 in front of it 13a, a 2 in front in FIG. 13b, a 3 in front in FIG. 13c and a 4 in front in FIG. 13d. Blades 112 of FIG. 13a turn down slightly near distal end 116, creating a lifting body that is somewhat "frisbee" shaped when spun rapidly. Blades 212 of FIG. 13b have a sharper downward turn toward distal ends 216. Blades 312 of FIG. 13c have both a rigid downward camber over its length and a slight thickening near distal end 316. Blades 412 of FIGS. 13d slope downward from proximal ends 418 to points 498 about three quarters of the way to distal end 416.

It will be obvious to those having skill in the art that many changes may be made to the details of the above-described embodiments of this invention without departing from the underlying principles thereof. The scope of the present invention should, therefore, be determined only by the following claims.

I claim:

1. A helicopter blade assembly for permitting rapid forward flight in a helicopter having separate means for providing a forward impetus, comprising:

substantially vertical mast; and a set of rotatable blades which sweep out the shape of a virtual disk having the properties of a lifting body when they are rapidly rotated by the mast; and a camber control assembly adapted to control the camber of the blades and comprising:

a hollow post element mounted about the mast;

a collar rotatable mounted about the hollow post element, the collar having a set of attachment points;

a set of physical connectors each having a first and a second end, and wherein each first end is attached to one of the attachment points and each second end is attached to the distal end of one of the blades; and a hollow post positioning assembly adapted to alter the horizontal position of the hollow post element relative to the mast, whereby when the blades are rotated the position of the hollow post element controls the asymmetric camber of the blades, thereby controlling the lifting body shape.

2. The assembly of claim 1 wherein the vertical position of the attachment points is altered to control the symmetric camber of the blades.

3. The assembly of claim 2 wherein the vertical position of the collar is altered to control the symmetric camber of the blades.

4. The assembly of claim 2 wherein the vertical position of the collar is fixed and the vertical position of the attachment points relative to the collar are changed to alter the symmetric camber of the blades.

5. The assembly of claim 1 wherein each blade has a hinge in its distal portion for permitting variations in pitch caused by the position of the collar.

6. The assembly of claim 1 wherein each blade has a distal portion that is made of material of sufficient flexibility that its camber can vary in response to the position of the collar.

7. A helicopter blade assembly for permitting rapid forward flight in a helicopter having separate means for providing a forward impetus, comprising:

a substantially vertical mast; and a set of rotatable blades which sweep out the shape of a virtual disk having the properties of a lifting body when they are rapidly rotated by the mast; and a blade camber adjustment assembly, including:

a swash plate assembly having a lower non-rotating plate and an upper rotatable plate;

a set of connectors, connecting the distal end of each blade to the rotatable plate;

a set of actuators for controlling the vertical position and the orientation of the swash plate assembly, thereby controlling the camber of the blades.

* * * * *